Feb. 1, 1955   M. M. ANDREWS   2,700,980
FLEXIBLE VALVE AND THE LIKE
Filed Aug. 2, 1950
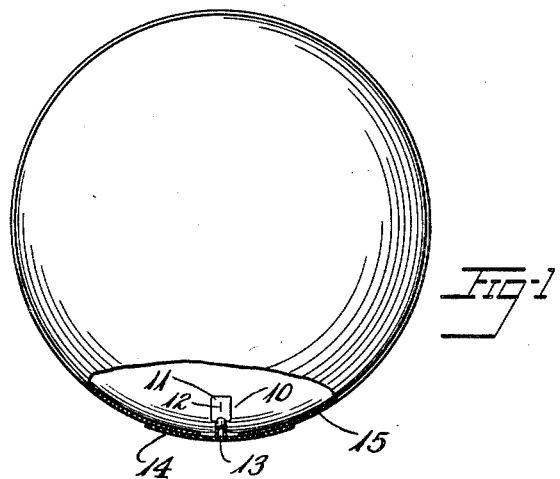
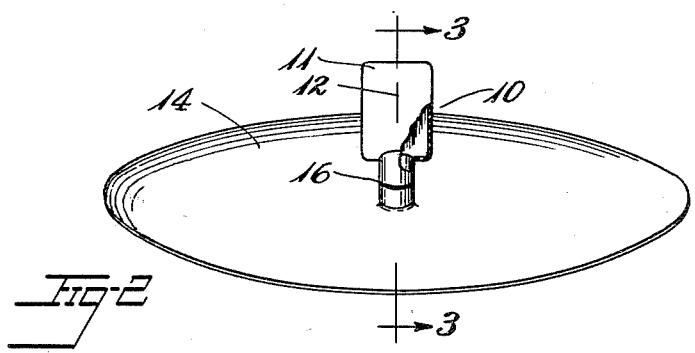
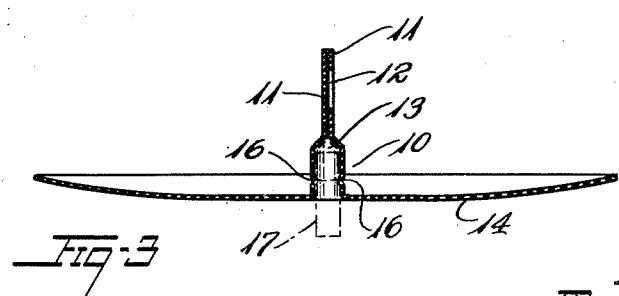
Inventor
Mary M. Andrews
By Robert W. Furlong
Atty.

2,700,980

FLEXIBLE VALVE AND THE LIKE

Mary M. Andrews, Akron, Ohio, assignor, by mesne assignments, to The B. F. Goodrich Company, Akron, Ohio, a corporation of New York Application August 2, 1950, Serial No. 177,177

1 Claim. (Cl. 137—223)

This invention relates to valves and pertains more particularly to flexible valves for inflatable articles.

It is an object of this invention to provide a valve for inflatable articles which prevents fluid under pressure from escaping from the inflated chamber of the article.

It is also an object of this invention to provide a flexible valve which is extremely durable and withstands rough usage.

Another object of this invention is to provide a flexible resilient valve of rubber-like material for flexible inflatable articles which is capable of being distorted from its normal contour when the article is folded into a compact unit.

Still another object of this invention is to provide a convenient and economical valve for flexible inflatable articles.

Other objects of this invention will be apparent from the drawings and description which follow.

In fabricating flexible inflatable articles it is desirable that the article be provided with a valve member that is entirely flexible so that the article may be conveniently folded into a compact unit without damage to the valve. It is also desirable that the article be provided with a valve member that will substantially prevent for long periods of time a fluid under pressure confined in the article from escaping through the valve causing deflation of the article.

I have invented a valve for inflatable articles which may be constructed entirely of a flexible resilient rubber-like material enabling the valve to be distorted from its normal contour without injuring the valve. My valve substantially prevents fluid under pressure from escaping from an inflated chamber of the article permitting the article to retain a desired contour for long periods of time without the necessity of further inflating the article.

In the drawings and description which follow, one embodiment of my invention is used as an illustration. However, it will be understood that I do not intend to limit my invention to this embodiment.

In the drawings:

Fig. 1 is a side elevation view partly broken away and in section of an inflated article showing a flexible valve embodying my invention;

Fig. 2 is an enlarged perspective view of the valve shown in Fig. 1; and

Fig. 3 is a view in section on line 3—3 of Fig. 2.

Referring to the drawings, the valve comprises a unitary rubber-like wall member 10 having normally flat members 11, 11 opposing each other in a face-to-face relationship and joined to each other along their margins. A relatively long narrow opening or slit 12 permits a fluid under pressure to pass through throat 13 into the interior of the article. Flange 14 provides a means for securing the valve to the wall 15 of the article with which the valve is associated, the valve proper, i. e., members 11, 11 and throat 13, extending inwardly into the inflatable chamber of the article. Relatively long narrow grooves or channels 16, 16 extending around throat 13 and generally parallel to flange 14 terminating short of a plane extending generally parallel and midway between members 11, 11 enable the portion of the valve above grooves 16, 16 including members 11, 11 to be preferentially distorted away from the above said plane.

To inflate an article having a valve embodying my invention a fluid under pressure is urged through throat 13 and opening 12, the pressure of the fluid forcing members 11, 11 apart and causing opening 12 to assume a generally oval configuration forming an unrestricted passageway allowing the fluid to enter the inflatable chamber of the article.

When the article has been inflated to the desired pressure, the flow of fluid through throat 13 is discontinued and the opposing faces of members 11, 11 of wall member 10 are urged together to a face-to-face contacting relationship because of the pressure exerted on members 11, 11 by the fluid under pressure retained in the inflated chamber of the article, thereby sealing opening 12 preventing the fluid in the inflated chamber from escaping to the atmosphere.

To deflate the inflated article a blunt rod or the like is inserted into throat 13 and between members 11, 11. The rod is manipulated to urge members 11, 11 apart and to maintain opening 12 open, thereby providing a passageway through which the fluid under pressure retained in the inflated chamber can pass to the atmosphere.

A preferred method of inflating an article associated with a valve constructed in accordance with my invention is to insert a hollow tube 17 into throat 13, as shown in dot-and-dash lines in Fig. 3, providing a nipple to which the fluid supply connection may be attached. To deflate the article one end of tube 17 is urged between members 11, 11 until members 11, 11 are forced apart and opening 12 is urged to an open condition allowing the fluid under pressure to pass through opening 12 and tube 17 to the atmosphere.

The valve may be made by any of the usual processes employed in the manufacture of rubbery goods, such as molding, but it is preferred to deposit the rubber-like material directly from latex or from an aqueous dispersion of rubber-like material upon the surface of a form of the desired configuration, employing a coagulant to build up the layer of rubbery material upon the surface of the form, if desired. The valve may be vulcanized either before or subsequent to the association of the valve with the body proper of the article. If it is desired, the valve and body proper of the article may comprise a unitary wall member obtained by forming the article and the valve in a single dipping operation depositing a rubber-like material on the surface of an appropriate dipping form.

The walls of the valve should be of such thickness and stiffness as to resist the forces exerted on the walls of the valve when the article associated with the valve is inflated, but they should not be so thick that the inflatable article is incapable of being inflated to a desired contour. Preferably the thickness of the walls of the valve are approximately equal to the thickness of the walls of the body proper of the inflatable article.

Because a valve wtihin the scope of my invention may be constructed entirely of a flexible rubber-like material, it is extremely durable and is capable of being greatly distorted from its normal configuration permitting a flexible article with which the valve is associated to be readily folded into a compact unit to facilitate storing the article in a minimum space.

It is obvious that this invention has wide applicability to hollow inflatable articles with relatively thin flexible rubber-like wall members, such as toys, meteorological balloons, and the like.

It is clear that obvious variations and modifications of this invention may be made without departing from the spirit and scope of the invention as defined in the appended claim.

I claim:

A valve for an inflatable article comprising a pair of flexible resilient flat wall portions closely opposing each other in face-to-face relationship, at least one of said flat wall portions having a slit opening therethrough remote from the margins thereof, and a flexible resilient hollow throat member extending from adjacent edges of said flat wall portions and having its longitudinal axis in a plane extending generally parallel to and midway between said flat wall portions, said hollow throat member having an inwardly directed groove therein extending around a portion of its circumference and in a plane generally perpendicular to the said longitudinal axis of said hollow throat member, said groove being disposed entirely on the same side of and terminating short of said plane extending parallel to and midway between said flat wall portions, the adjacent margins of said flat wall portions extending from the said hollow throat member on the one side to the said hollow throat member on the other side being sealed together along their entire extent.

References Cited in the file of this patent

UNITED STATES PATENTS

| | | |
|---|---|---|
| 599,454 | Nugent | Feb. 22, 1898 |
| 606,069 | Mohs | June 21, 1898 |
| 614,968 | Mohs | Nov. 29, 1898 |
| 1,702,974 | MacDonald | Feb. 19, 1929 |
| 1,827,028 | Malcom | Oct. 13, 1931 |
| 1,942,959 | Fenton | Jan. 9, 1934 |
| 2,061,240 | Leins | Nov. 17, 1936 |
| 2,212,733 | Grigsby | Aug. 27, 1940 |
| 2,604,297 | Winstead | July 22, 1952 |

FOREIGN PATENTS

| | | |
|---|---|---|
| 23,585 | Great Britain | 1897 |
| 424,451 | Great Britain | 1935 |